United States Patent
Kothari et al.

(10) Patent No.: US 7,174,536 B1
(45) Date of Patent: Feb. 6, 2007

(54) INTEGRATED INTERACTIVE SOFTWARE VISUALIZATION ENVIRONMENT

(75) Inventors: Suraj C. Kothari, Ames, IA (US); Aravind Krishnaswamy, Redwood City, CA (US); Yogy Namara, Ames, IA (US); Yunbo Deng, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 385 days.

(21) Appl. No.: 09/781,638

(22) Filed: Feb. 12, 2001

(51) Int. Cl.
*G06F 9/44* (2006.01)
*G06F 9/45* (2006.01)

(52) U.S. Cl. ............ 717/109; 717/105; 717/113; 717/123; 717/125; 717/144; 717/155; 717/156

(58) Field of Classification Search ........ 717/131–133, 717/141–144, 146, 154–159, 107, 104, 105, 717/109, 112, 113, 143; 707/4; 714/38, 714/26; 711/5; 715/762, 854; 207/104.1
See application file for complete search history.

(56) References Cited

U.S. PATENT DOCUMENTS

| | | | |
|---|---|---|---|
| 4,949,243 A * | 8/1990 | Mohamed Ali et al. ........ 711/5 |
| 5,175,856 A * | 12/1992 | Van Dyke et al. .......... 717/151 |
| 5,297,150 A * | 3/1994 | Clark ..................... 714/26 |
| 5,317,511 A * | 5/1994 | Jacobson ................. 715/854 |
| 5,347,639 A | 9/1994 | Rechtschaffen et al. .... 395/375 |
| 5,355,492 A * | 10/1994 | Frankel et al. ............. 717/151 |
| 5,371,747 A * | 12/1994 | Brooks et al. ............. 714/38 |
| 5,412,784 A | 5/1995 | Rechtschaffen et al. .... 395/375 |
| 5,485,616 A * | 1/1996 | Burke et al. .............. 717/133 |
| 5,740,421 A * | 4/1998 | Palmon .................. 707/4 |
| 5,768,564 A * | 6/1998 | Andrews et al. ........... 717/137 |
| 5,819,094 A * | 10/1998 | Sato et al. ............... 717/131 |
| 5,857,180 A | 1/1999 | Hallmark et al. ........... 707/2 |
| 5,966,686 A * | 10/1999 | Heidorn et al. ............. 704/9 |
| 6,041,177 A * | 3/2000 | Kawabe et al. ............ 717/125 |
| 6,212,677 B1 * | 4/2001 | Ohkubo et al. ............ 717/143 |
| 6,219,833 B1 * | 4/2001 | Solomon et al. ........... 717/149 |
| 6,279,149 B1 * | 8/2001 | Field et al. ............... 717/129 |

(Continued)

OTHER PUBLICATIONS

Abramson, D., et al., "Relative Debugging and its Application to the Development of Large Numerical Models", *Association for Computing Machinery, Inc. (ACM)*, Copyright by ACM, pp. 1-12, (1995).

(Continued)

*Primary Examiner*—Antony Nguyen-Ba
(74) *Attorney, Agent, or Firm*—Schwegman, Lundberg, Woessner & Kluth, P.A.

(57) ABSTRACT

A method, system, apparatus, and program product for displaying a program slice diagram, which represents source code. The program slice diagram includes a directed graph that has multiple nodes and arcs connecting the nodes. Nodes can correspond to statements within a selected subroutine of the source code, variable references outside the subroutine, or calls made to other subroutines that are considered part of the program slice. Arcs represent data flow dependencies between the nodes. In another aspect, the invention encompasses a software environment for visualizing source code that includes a code browser, a block-level abstract syntax tree viewer, a program slice browser, and a template viewer. This software visualization environment is integrated, allows cross-referencing between its components, and is coupled with a performance visualization environment.

23 Claims, 10 Drawing Sheets

U.S. PATENT DOCUMENTS

| | | | |
|---|---|---|---|
| 6,324,678 B1 * | 11/2001 | Dangelo et al. | 716/18 |
| 6,518,979 B1 * | 2/2003 | Spertus et al. | 715/762 |
| 6,594,783 B1 * | 7/2003 | Dollin et al. | 714/38 |
| 6,651,246 B1 * | 11/2003 | Archambault et al. | 717/160 |
| 6,742,003 B2 * | 5/2004 | Heckerman et al. | 707/104.1 |
| 6,742,175 B1 * | 5/2004 | Brassard | 717/107 |
| 6,799,181 B2 * | 9/2004 | Vishnubhotla | 707/100 |

OTHER PUBLICATIONS

Abramson, D., et al., "Relative Debugging: A New Methodology for Debugging Scientific Applications", *Communcations of the ACM, 39 (11)*, pp. 69-77, (Nov. 1996).

Ahmad, I., et al., "Automatic Parallelization and Scheduling of Programs on Multiprocessors using CASCH", *IEEE Publication*, No. 0190-3918/97, pp. 288-291, (1997).

Ahmed, S., et al., "The Linda Program Builder", *Proceedings of the 3rd Workshop on Languages and Compilers for Parallelism*, MIT Press, pp. 1-18, (1991).

Anderson, J.M., et al., "Global Optimizations for Parallelism and Locality on Scalable Parallel Machines", *ACM SIGPLAN Notices, 28 (6)*, pp. 112-125, (Jun. 1993).

Anthes, R.A., et al., "Development of Hydrodynamic Models Suitable for Air Pollution and Other Mesometeorlogical Studies", *Monthly Weather Review, 106 (8)*, pp. 1045-1078, (Aug. 1978).

Banatre, J., et al., "The Gamma Model and Its Discipline of Programming", *Science of Computer Programming, 15*, pp. 55-57, (Nov. 1990).

Banerjee, U., et al., "Automatic Program Parallelization", *Proceedings of the IEEE, 81*, pp. 211-243, (Feb. 1993).

Beletsky, V., et al., "A Package for Automatic Parallelization of Serial C-Programs for Distributed Systems", *IEEE Publication*, No. 0-8186-7177, pp. 184-188, (Jul. 1995).

Bodin, F., et al., "Sage ++: An Object-Oriented Toolkit and Class Library for Building Fortran and C++ Restructuring Tools", *Technical Report, Deptartment of Computer Science, Indiana University*, pp. 1-16, (1993).

Bowdidge, R.W., et al., "Supporting the Restructuring of Data Abstractions through Manipulation of a Program Visualization", *ACM Transactions on Software Engineering and Methodology, 7 (2)*, pp. 109-157, (Apr. 1998).

Cheng, D.Y., "A Survey of Parallel Programming Tools", *Technical Report RND-91-005*, NASA Ames Research Center, Moffet Field, CA, pp. 1-70, (1993).

Derra, S., "Breaking the Code", *Inside Iowa State*, 2 p., (Mar. 21, 1997).

Di Martino, B., et al., "Towards Automated Code Parallelization through Program Comprehension", *IEEE Publication*, No. 0-8186-5647, pp. 108-115, (Jun. 1994).

Dongorra, J.J., et al., "Environments and Tools for Parallel Scientific Computing", *Advances in Parallel Computing, 6*, Table of Contents Only, pp. I-XVI, (1993).

Ernst, M.D., et al., "Slicing pointers and procedures (abstract)", *Microsoft Research Technical Report MSR-TR-95-23*, Microsoft Research, Redmond, WA, pp. 1-16, (1995).

Friedman, R., et al., "Fortran Parallelization Handbook", *Preliminary Edition, Applied Parallel Research*, Sacramento, CA, pp. 1-86, (Apr. 1995).

Goldberg, A., et al., "Specification and Development of Parallel Algorithms with the Proteus System", *DIMACS, 18*, pp. 383-399, (May 1994).

Hiranadani, S., et al., "The D Editor: A New Interactive Parallel Programming Tool", *Proceedings of Supercomputing Conference*, Washington, D.C., pp. 733-742, (Nov. 1994).

Huelsbergen, L., et al., "Dynamic Program Parallelization", *ACM Publication*, No. 0-89791-483, pp. 311-323, (1992).

Jackson, D., et al., "Abstraction Mechanisms for Pictorial Slicing", *IEEE Publication*, pp. 82-88, (1994).

Kessler, C.W., et al., "Pattern-Driven Automatic Program Transformation and Parallelization", *IEEE Publication*, No. 1066-6192, pp. 76-83, (1995).

Kothari, S.C., et al., "1998 Progress Report: Parallelization Agent for Legacy Codes in Environmental Modeling", *National Center for Environmental Research and Quality Assurance* http://es.epa.gov/ncerga/progress/kothari98.html, 1-3, p., (1998).

Kothari, S.C., et al., "Optimal Designs of Linear Flow Systolic Architectures", *Proceedings of the International Conference on Parallel Processing, vol. I Architecture*, Pennsylvania State University Press, University Park, Pennsylvania, pp. 247-256, (Aug. 8-12, 1989).

Kothari, S.C., et al., "Parallelization Agent for Atmospheric Models", *Proceedings of the Symposium on Regional Weather Prediction on Parallel Computer Environments*, SKIRON, University of Athens, Greece, 1-10 p., (Oct. 1997).

Kothari, S.C., et al., "Parallelization Agent for Legacy Codes in Environmental Modeling", *Application for Federal Assistance*, 33 p., (Mar. 13, 1996).

Li, J., et al., "The Data Alignment Phase in Compiling Programs for Distributed-Memory Machines", *Journal of Parallel and Distributed Computing, 13 (2)*, pp. 213-221, (Oct. 1991).

Massingill, B., "Mesh Computations", *Tech Report, CalTech Technical Report*, pp. 1-35, (1995).

Messina, P., et al., "System Software and Tools for High Performance Computing Environments", *A Society for Industrial and Applied Mathematics Publication*, Philadelphia, Table of Contents Only, pp. 1-9, (1993).

Mitra, S., "A Class-based Approach to Parallelization of Legacy Codes", *Iowa State University Dissertation*, Ames, IA, 1-50 p., (1997).

Ning, J.Q., et al., "Automated Support for Legacy Code Understanding", *Communications of the ACM, 37 (5)*, pp. 50-57, (May 1994).

Reps, T., et al., "Precise Interprocedural Choppin", *Proc. of the 3rd ACM Symp. on Foundations of Software Engineering*, Washington, D.C., 12 p., (Oct. 1995).

Reps, T., et al., "Speeding up Slicing", *Proc. of the 2nd ACM SIGSOFT Symp. on Foundations of Software Engineering*, New Orleans, LA, pp. 11-20, (Dec. 1994).

Skillicorn, D.B., "Architecture-Independent Parallel Computation", *IEEE Computer Society, 28*, pp. 38-51 (Dec. 1990).

Snyder, L., "A Practical Parallel Programming Model", *DIMACS, 18*, pp. 143-160, (May 1994).

Valiant, L.G., "A Bridging Model for Parallel Computation", *Communications of the ACM, 33 (8)*, pp. 103-111, (Aug. 1990).

Watts, T.M., et al., "Techniques for Integrating Parallelizing Transformations and Compiler Based Scheduling Methods", *IEEE Publication*, No. 1063-9535, pp. 830-839, (1992).

Williams, R.D., "DIME: A Programming Environment for Unstructured Triangular Meshes on a Distributed-Memory Parallel Processor", *The Third Conference on Hypercube Concurrent Computers and Applications*, vol. II, pp. 1770-1787, (Jan. 1988).

Yang, J.A., et al., "Parallel-Program Transformation using a Metalanguage", *ACM Publication*, No. 0-897910-390-6, pp. 11-20, (Jun. 1991).

\* cited by examiner

US 7,174,536 B1

INTEGRATED INTERACTIVE SOFTWARE VISUALIZATION ENVIRONMENT

STATEMENT AS TO RIGHTS TO INVENTIONS MADE UNDER FEDERALLY SPONSORED RESEARCH AND DEVELOPMENT

Portions of the present invention were made with the support of the United States Government via a grant from the United States Environmental Protection Agency (EPA) under grant R-825206-01-0. The U.S. Government has certain rights in the invention.

FIELD OF THE INVENTION

This invention relates generally to computers and more particularly to slices of computer programs.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© Iowa State University Research Foundation, 2000. All Rights Reserved.

BACKGROUND OF THE INVENTION

As computers have become more advanced, the computer programs that operate and run on them have become much larger and more complicated. Some computer programs have been written over the course of years, or even decades, and the people who originally designed and wrote them are no longer available. Thus, it is often an arduous task to understand, let alone debug (find and correct errors in) large, complicated computer programs.

One program understanding and debugging technique is known as a program slice, which is a sequence of program statements that are influential on the value of one or more program variables at given points. Prior products used a program slice simply as a sequence of program statements, which is a significant limitation because for a large program the program slice can be quite large and complicated, and it is not easy for a programmer to use it for the logical analysis necessary for program understanding and debugging. For example, prior products do not provide a way to navigate through the program slice and visualize the structure of the program.

Prior products build control-flow and data-flow representations of a program a priori, and therefore might require prohibitively large amounts of storage and time when analyzing large programs. These products do not support any mechanisms to deal with the large volume of analysis data and its complexity.

Domain-specific knowledge often plays an important role in creating simplified representations that help in understanding a complex program. For example, it is a common practice to create a high-level mode, such as block diagrams with annotations, in order to understand a complex program. Existing tools do not provide any mechanism to visualize and analyze a program with respect to its high-level model.

Prior products allow the user to set breakpoints in code and check values of a set of variables as the program execution steps through breakpoints. But, the user must decide where to set the breakpoints and which variables to monitor. These choices are critical, and without proper choices the debugging can be time consuming. This is especially so in a case where the execution takes an extended period of time, and it is not practical to do many debugging trials. For a small program, the user often logically analyzes the program and creates a hypothesis for debugging, which is very difficult to do for a large and complex program.

Thus, there is a need for a method, system, and product program that overcomes the disadvantages of the prior art, provides an integrated and interactive visualization environment with multiple views of a program, includes a cross-referencing capability between the views, performs inter-procedural analysis for debugging, sets automatic breakpoint, and enables the programmer to visualize a program slice diagram and deal with its complexity by abstraction mechanisms.

SUMMARY OF THE INVENTION

The present invention provides solutions to the above-described shortcomings in conventional approaches, as well as other advantages apparent from the description below.

In one aspect, the invention is a method, system, apparatus, and program product for displaying a program slice diagram, which represents source code. The program slice diagram includes a directed graph that has multiple nodes and arcs connecting the nodes. Nodes can correspond to statements within a selected subroutine of the source code, variable references outside the subroutine, or calls made to other subroutines that are considered part of the program slice. Arcs represent data flow dependencies between the nodes.

In another aspect, the invention encompasses a software environment for visualizing source code that includes a code browser, a block-level abstract syntax tree viewer, a program slice browser, and a template viewer. This software visualization environment is integrated, allows cross-referencing between its components, and is coupled with a performance visualization environment.

DETAILED DESCRIPTION OF THE INVENTION

In the following detailed description of exemplary embodiments of the invention, reference is made to the accompanying drawings (where like numbers represent like elements) that form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

Figure 1:
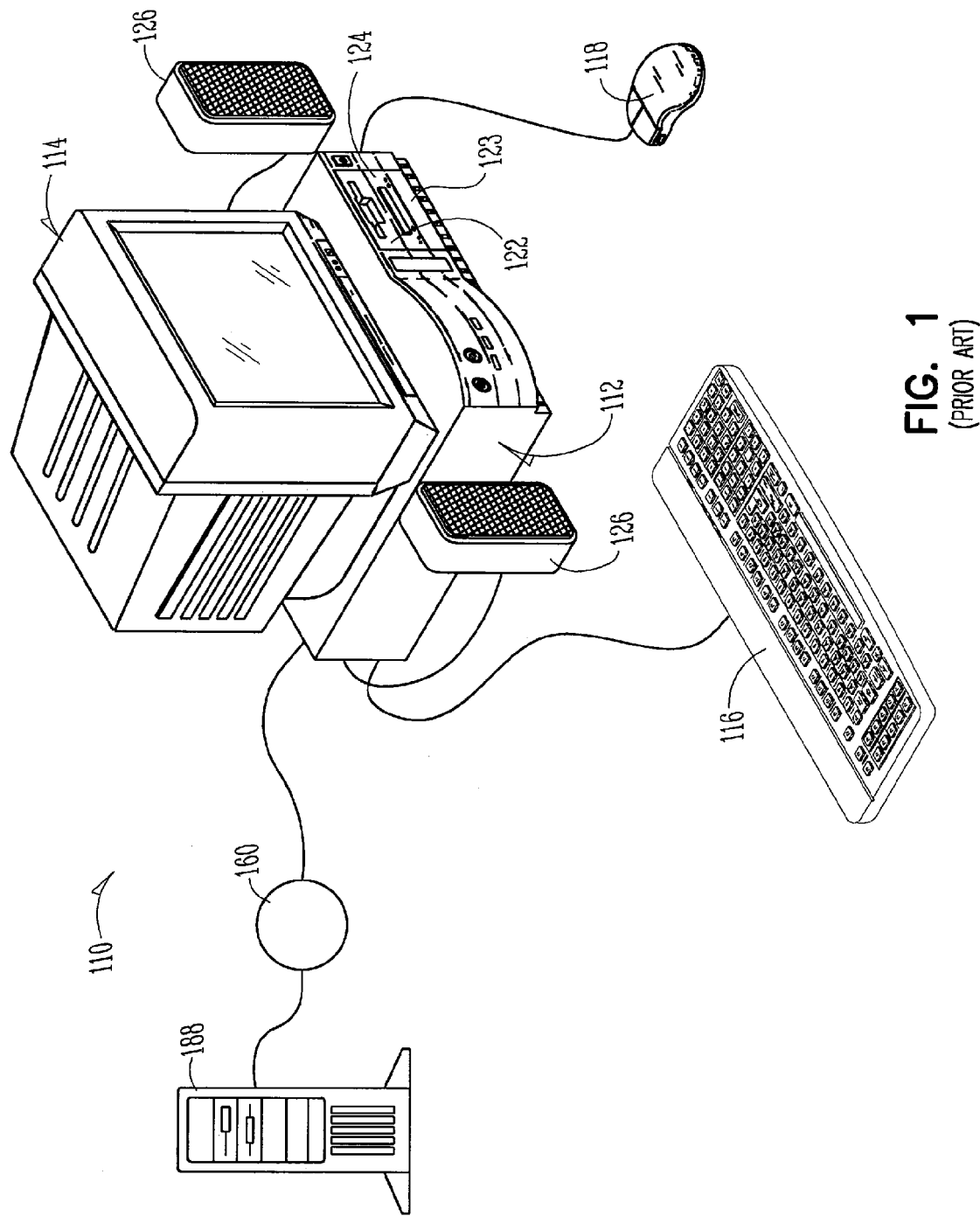
FIG. 1 depicts a pictorial example of a computer system that can be used to implement an embodiment of the invention.

FIG. 1 depicts a pictorial example of a computer system that can be used to implement an embodiment of the invention. Computer system 110 is connected to remote server computer system 188 via network 160. In another embodiment, computer system 110 is a standalone system that is not connected to a network. Computer system 110 includes processing unit 112, display device 114, keyboard 116, pointing device 118, and speakers 126. Processing unit 112 receives input data from input devices such as keyboard 116, pointing device 118, and network 160 and presents output data to a user via display device 114 and speakers 126. Pointing device 118 is used in conjunction with a graphical user interface (GUI) in which hardware components and software objects are controlled through the selection and the manipulation of associated graphical objects displayed via display device 114. Although computer system 110 is illustrated with a mouse for pointing device 118, in other embodiments graphical-pointing devices such as a graphic tablet, joystick, trackball, or track pad can also be used.

Keyboard 116 is that part of computer system 110 that resembles a typewriter keyboard and that enables a user to control particular aspects of the computer. Keyboard 116 includes a standard set of printable characters presented in a "QWERTY" pattern typical of most typewriters.

Video-display terminal 114 is the visual output of computer system 110. Video-display terminal 114 can be a cathode-ray tube (CRT) based video display well known in the art of computer hardware. But, with a portable or notebook-based computer, video display terminal 114 can be replaced with a liquid crystal display (LCD) based or gas, plasma-based, flat-panel display.

To support storage and retrieval of data, processing unit 112 further includes diskette drive 122, hard-disk drive 123, and CD-ROM drive 124, which are interconnected with other components of processing unit 112. Although diskette drive 122, hard-disk drive 123, and CD-ROM drive 124 are shown incorporated into system unit 112, in other embodiments they are external to system unit 112, either connected directly, on a local area network (LAN), on network 160, or attached to remote computer system 188.

Computer system 110 can be implemented using any suitable computer such as an IBM-compatible personal computer available from a number of vendors. In one embodiment, computer system 110 is thus a configuration that includes all functional components of a computer and its associated hardware. In general, a typical computer system includes a console or processing unit such a processing unit 112, with one or more disk drives, a monitor such as video display terminal 114, and a keyboard such as keyboard 116.

Figure 2:
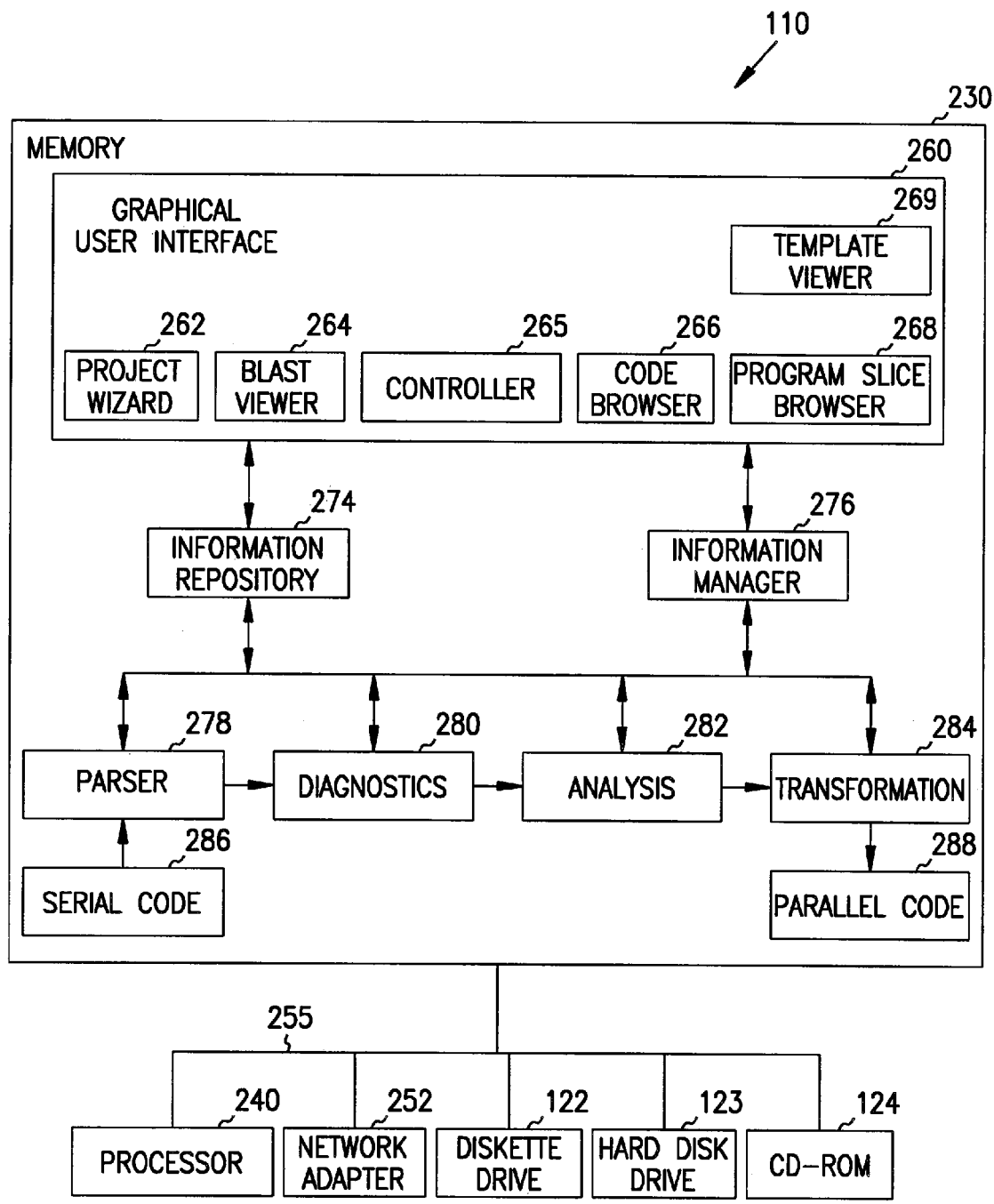
FIG. 2 depicts a block diagram of the principal components of the computer system in an embodiment of the invention.

FIG. 2 depicts a block diagram of the principal components of processing unit 112 of computer 110. Computer 110 contains memory 230 connected via bus 255 to processor 240, network adapter 252, diskette drive 122, hard-disk drive 123, and CD-ROM drive 124. Although the various components of FIG. 2 are drawn as single entities, in other embodiments each may consist of multiple entities and may exist at multiple levels.

Memory 230 comprises a number of individual, volatile-memory modules that store segments of operating system and application software while power is supplied to computer 110. The software segments are partitioned into one or more virtual memory pages that each contains a uniform number of virtual memory addresses. When the execution of software requires more pages of virtual memory than can be stored within memory 230, pages that are not currently needed are swapped with the required pages, which are stored within non-volatile storage devices 122 or 123. Memory 230 is a type of memory designed such that the location of data stored in it is independent of the content. Also, any location in memory 230 can be accessed directly without needing to start from the beginning.

Memory 230 contains graphical user-interface component 260, information repository 274, information manager 276, parser 278, diagnostics 280, analysis module 282, and transformation module 284, all of which contain instructions capable of being executed by processor 240. In the alternative, they can be implemented by control circuitry though the use of logic gates, programmable logic devices, or other hardware components in lieu of a processor-based system. Memory 230 also contains serial code 286 and parallelized code 288, both of which contain instructions capable of being executed by processor 240.

Graphical user interface component 260 helps the user to visualize the software source code of interest, such as serial code 286 or parallel code 288. This visualization is provided by the components of graphical user interface 260: project wizard 262, BLAST (Block-Level Abstract Syntax Tree) viewer 264, controller 265, code browser 266, program slice browser 268, and template viewer 269. Graphical user interface 260 provides a knowledge-exchange capability that facilitates exchange of high-level knowledge between the user and the system. The user specifies the context for the analysis such as an underlying numerical method. This context is valuable to simplify and customize the program analysis. Graphical user interface 260 answers queries and displays high-level views to facilitate understanding of large and complex programs.

Graphical User Interface

Graphical user interface 260 provides several facilities to help the user navigate through complex software. BLAST viewer 264 shows the code structure by displaying its control blocks. An example screen of BLAST viewer 264 is further described below with reference to FIG. 3. Code browser 266 displays the source code and allows the user to trace the read/write accesses of a selected variable. Example displayed screens of code browser 266 are further described below with reference to FIGS. 3 and 6. Template viewer 269 enables knowledge-based software visualization and is further described below with reference to FIG. 6. Controller 265 provides coordination between BLAST viewer 264, code browser 266, and program slice browser 268 to provide a cross-referencing capability, which also helps in navigation through the code.

Project wizard 262 allows the user to import or export files. The user can save important annotations and resource information. Project wizard 262 permits the user to maintain audit trails and revision control information.

Program Slice Browser

Program Slice Browser (PSB) 268 helps the user visualize and debug the code via a display of program slice diagrams. The actions of program slice browser 268 are further described below with reference to FIGS. 7, 8, 9, and 10. A program slice is a program debugging and understanding technique and is a sequence of program statements that are influential on the value of one or more variables at given points. Program slice browser 268 represents the program slice by a diagram, which is a directed graph of nodes with labeled arcs. The nodes represent statements in the program slice, and the arcs represent data flow dependencies between nodes. When represented as a diagram, a program slice is no longer a linear sequence of statements.

A program slice of a selected variable at a selected point is defined as follows: given a variable vector V in which each element of $v_i$ is a variable to be checked and a location point of program p, program slice SLICE(V, p) is the sequence of statements that influence the definition of each variable $v_i \gamma V$ that can reach p. The program slice is obtained by ud-chain (use-definition) analysis. A ud-chain is a list, for each use of a variable, of all the definitions that reach that use. The ud-chain analysis of program slice browser 268 is based on the results of a read set and a write set. The read/write set is computed at three levels: statement level, block level, and procedure level.

For a statement, the read/write set contains the variables appearing on the right-hand side or left-hand side of the statement. For a block, the read/write set contains variables used in the block and the variables defined in the block. In one embodiment, there are three types of blocks: ordinary blocks that contain linear sequence of code, subroutine blocks that have a call statement, and control blocks such as "IF" and "DO" blocks.

The read/write set of a subroutine block contains variables used or defined in the subroutine. Thus, the read/write set of a subroutine block is treated as other normal blocks in the analysis of the caller. But, obtaining of the read/write set of a call block is a procedure-level analysis.

If no other subroutines are called within a subroutine, the intraprocedural analysis of a program slice is simple. When there is another subroutine called in the current subroutine, interprocedural analysis is required. During intraprocedural analysis, program slice browser 268 follows back the control flow. When a call statement (i.e., a call block) is reached, program slice browser 268 checks whether the variable to be followed is a common variable or an actual parameter. For example, if variable "a" is a common variable and belongs to the writing set of the subroutine block, program slice browser 268 applies another intraprocedural analysis to the called subroutine starting from the end of the called subroutine. If variable "a" is an actual parameter and in the write set, program slice browser 268 maps "a" to its corresponding formal parameter "b" and builds the program slice of "b" starting from the end of the subroutine.

When the start point of the subroutine is reached, program slice browser 268 exports all nonterminated variables to the outside. Program slice browser 268 then proceeds to the callers of the current subroutine and obtains the program slice of exposed variables in the caller starting from the point where the current subroutine is called.

Because at compile-time the caller cannot be predicted, program slice browser 268 includes the union of all potential callers in the slice calculation. Program slice browser 268 saves the call order information in a structure called a call order tree. It is called a tree because program slice browser 268 displays the calling relationships in a tree style.

Program slices can be very large and hard to interpret because of their complexity. Without proper visualization and abstraction mechanisms to focus on critical parts of the slice, it is hard to make good use of program slicing. To be able to use program slices for understanding, debugging, and performance tuning purposes, the following features are incorporated into program slice browser 268.

Program Slice Abstractions

Program slice browser 268 provides abstraction mechanisms to extract useful information from a program slice and to facilitate understanding of large, complex programs. When the program becomes large and complicated, the program slice diagram tends to be large and complex, which is a problem that abstraction mechanisms solve. An abstraction is a simplified view of a program slice, so that the user can concentrate on a more essential and comparatively smaller part of the program slice diagram. The abstractions are used to represent the structure and control flow of the program, to manage the complexity of large number of variables by partitioning them into meaningful equivalence classes, and to isolate critical information from the large body of a program.

In one embodiment, program slice browser 268 provides two types of abstractions: syntactic abstractions and semantic abstractions. A syntactic abstraction allows the user to collapse into a single node, several nodes corresponding to one or more blocks of BLAST viewer 264. A semantic abstraction allows the user to collapse into a single node, several nodes corresponding to a logical category of computations.

Abstractions are at different levels to provide different details. For project comprehension, the overview of the project is important. The user usually tends to be more concerned with the relationship between procedures or modules. Within a procedure, the relationship between different syntax structures becomes more important. For a programmer who is working hard to locate a bug, the program slice diagram provides statement level information so that the programmer can find the problem at a specific point of the program. In one embodiment, program slice browser 268 includes four levels of abstractions: block-level abstractions, procedure-level abstractions, graph-level abstractions, and domain-specific semantic entities.

Block-Level Abstractions

During debugging, the programmer tends to focus locally in a small part of the program, and it is natural that syntax structure is used to help determine the scope of the localization. The programmer may have some candidate suspects for the location of the bug, so the programmer checks the suspects one-by-one, isolates the verified parts, and moves focus closer and closer to the source of problem.

Block level abstraction is an abstraction that conforms to the programmer's habit. Blocks are syntax units defined in the source code being analyzed. There are three types of blocks: ordinary blocks, call blocks, and control blocks. A block-level abstraction encapsulates statements belonging to a block and represents them as a single node of the program slice diagram. This new node is labeled by the block type and the source code line numbers defining the boundary of the block, e.g. DO[10,23]. Formally, the block-level abstraction on a slice S and a block B is a binary operation defined as follows:

BLOCK(S, B)=(S−{(e, d, V)|e∈B or d∈B})∪{(c, d, V)|∃(e, d, V)∈S where e∈B and d∉B, and c is the new node representing the block B}∪{(e, c, V)|∃(e, d, V)∈S where d∈B and e∉B.}

The user can enable this abstraction by clicking the "block-level abstraction" button on the program slice browser toolbar and then by using BLAST viewer 264 to select the block to be encapsulated. Program slice browser 268 and BLAST viewer 264 interact via controller 265 to carry out these actions.

Block-level abstractions encapsulate information internal to a block and simplify a program slice diagram by reducing the number of nodes and the number of edges. The nodes belonging to each selected block are merged together to form a new node. This new node retains the dependence relation between the merged nodes and the rest of the nodes, but all relations within the block are hidden.

Block-level abstractions are useful for top-down debugging. Debugging is done at the block-level to begin with and after a defective block is identified, then the internals of the block are checked. For complex legacy code, top-down debugging is often desirable. Without the use of top-down debugging, e.g., checking at the statement-level for the entire slice can be time consuming and tedious. With top-down debugging, it is possible to limit the statement-level checking to only a small part of the program slice.

Block-level abstractions are further described below with reference to FIG. 5.

Procedure-Level Abstractions

A procedure-level abstraction simplifies a program slice diagram by retaining only the information about procedure calls. Consider the following example: a program contains a first statement that reads a common variable A and a second statement that reads a local variable B. Then, in procedure DUMMY of the program, both A and B are changed because they are passed into DUMMY as actual parameters. After the procedure level-abstraction, program slice browser 268 removes the nodes representing the first and second statements from the program slice diagram. A new edge labeled "A, B" points to the "DUMMY" node indicating variables A and B are changed in DUMMY. In this way, the programmer can easily grasp the dependence relationships between the current procedure and other procedures. This is especially useful in the case of FORTRAN programs because of the pervasive use of common (global) variables and the use of reference parameters. The user can enable the procedure-level abstraction by selecting the procedure-level abstraction button in the program slice browser toolbar.

Formally the procedure level abstraction on a slice S is a unary operation defined as follows:

PROC(S)=(S−{(e, d, V)|neither e nor d is a call block}) ∪{(x, y, V)|∃a path p from the call block x to call block y in S, and V is the dependence vector along p}.

Procedure-level abstraction is further described below with reference to FIG. 4.

Graph-Level Abstractions

The third abstraction is called a graph-level abstraction, elimination, graph cut-off, or pruning. The idea behind this abstraction is to simulate the debugging process when the programmer wants to put the verified part aside and concentrate on the unverified parts. It is useful when at a ramification point of a program slice diagram, the programmer determines that the values of influential variables at one of branches are correct while they are wrong at the other branch. Using pruning, the programmer can remove the branch with correct values before the point and concentrate on the problematic branch. Thus, program slice browser 268 provides the ability to prune the directed graph that depicts the program slice.

The elimination abstraction is formally defined as a binary operation E on S and node f. E(S, f)=S−{(e, d, V)|∀a∈S, a's partial order is greater than f, and ∀V(a, d,V)∉S}.

Program slice browser 268 provides a binding between a program slice as lines of code, the directed graph representation of the program slice, and modified views of the directed graph resulting from changes due to abstractions and pruning. The system uses that binding to instrument the code properly.

Program Comprehension

The visualization environment provided by graphical user interface 260 can be used to reduce the significant amount of time software developers routinely spend before they can start working (modifying/enhancing) with an unfamiliar code. Using this environment, the user can visualize the software at different levels (the actual code, syntactic structure of the code, or program slice) to focus on specific parts of the program, or the semantic structure of the code. Note that these directly correspond to the four visualization components (BLAST viewer 264, code browser 266, program slice browser 268, and template viewer 269) integrated into the visualization environment. Apart from four different views of the code, the user can gain further understanding about complex software in following ways:

By cross-referencing different views of the software, the user can uncover important relationships. For example, the user can relate the program slice browser and BLAST displays and analyze a program slice with respect to a selected block.

By interacting with the environment, the user can quickly navigate through the code. For example, the user can navigate through the code by following through paths in a program slice graph. As another example, the user can quickly traverse through the BLAST viewer window and at any point click on the BLAST node and see the code corresponding to the node.

By using a compact or a simplified view, the user can understand the complexity of large software without becoming lost in micro-level details. Syntactic and semantic forms of compact views are provided through BLAST viewer 264 and template viewer 269, respectively. Simplifications are possible through abstraction mechanisms.

Maintenance and Documentation

The visualization environment can be used to assist in maintenance of complex software. Among the four views, the template view provides a binding between the logical views of the software. The template is defined in terms of abstract data structures and logical algorithmic steps, which manipulate these abstract structures. The template represents high-level understanding of the program. These structures and steps may be dispersed through the program, and they are bound to the program through the interactive diagnostic phase. Once created, the template view captures the complicated program structure and makes it easier to maintain.

The structural and data flow information obtained through the visual environment can be used to document the software. For example, the control structure is easily documented by using the display obtained from BLAST viewer 264. Another way of documentation is through the use of program slice browser 268. To document data and control for an important computation, one can obtain a program slice diagram based on the output of that computation, simplify it if necessary through abstractions, and relate it to the BLAST view through cross-referencing.

Relative Debugging

In one embodiment, program slice browser 268 is used to debug serial code 286. But, in another embodiment, program slice browser 268 is used in a software-reengineering environment in which serial code 286 is converted into parallel code 288 and debugged. The objective of parallelization is to achieve the same results as the sequential code in a parallel style, so that the parallel code can solve problems faster or solve larger scale problems. The strategy of verifying the correctness of the parallel code by comparing it with the referenced sequential code is called relative debugging. Thus, parallel code 288 is debugged using program slice browser 268 to ensure that parallel code 288 produces the same result as serial code 286.

To support this reengineering environment, program slice browser 268 provides a relative debugging capability, which locates errors in a new version of a program by automated, runtime comparison of the original and reengineered versions of the program, for example serial code 286 and parallel code 288, respectively. The distinctive feature is the integration of the program analysis and the debugging capabilities. Using static analysis of a program, the user can isolate probable sources of error(s) and determine the appropriate breakpoints for the debugging.

The basic idea of relative debugging is that by inserting assertions or traces at appropriate places in both sequential code 286 and parallel code 288, the relative debugger finds problems by comparing the differences between the output of parallel code and sequential code. A conventional debugger allows the user to set breakpoints in code and check values of a set of variables as the execution steps through the breakpoints. The user must decide where to set the breakpoints and which variables to monitor. These choices are critical and without proper choices, the debugging can be very time consuming. This is especially so in a case where the execution takes an extended period of time and it is not practical to do many debugging trials. For a small program, the user often does a logical analysis of the program and creates a hypothesis for debugging. This is difficult to accomplish for a large and complex program.

Graphical user interface 260 provides a relative debugger to solve this problem. Because the parallel code is structurally close to the sequential code, program slice browser 268 can find the corresponding points between the parallel code and the sequential code. Program slice browser 268 creates the program slice diagram, which is the map of the breakpoints where the results should be compared. By interacting with code generation component of the parallelizing compiler, the program slice diagram generates assertions and traces automatically.

First, the user identifies a variable (usually one of the outputs) that is computed incorrectly. The user traces the variable using code browser 266 and BLAST viewer 264 and pinpoints the locations where the variable is modified. But, this by itself is not enough for the following reasons. The variable might be passed as a parameter to a subroutine that modifies it, in which case the name of the parameter is likely to be different from the variable name, and thus the modification cannot be discovered by tracking the variable name. Another problem is the real bug can be hidden in miscalculation of another variable that is used indirectly to calculate the value of the variable being tracked. Program slice browser 268 discovers all such modifications.

For a large program, the program slice can be large, and it is not easy for the programmer to use it for the logical analysis necessary to determine the breakpoints for debugging. Also, it is not enough to look at the program slice within a subroutine because the bug may be hidden in another subroutine. Thus, program slice browser 268 employs interprocedural analysis and provides a way to visualize a slice and deal with its complexity through abstractions. This enables the user to view the slice as a network with possibly faulty links. For example, the user can use graph algorithms for fault analysis to minimize the number of links that need to be checked to identify the faulty link(s).

The software visualization environment provides convenience where the user can set the breakpoints through graphical user interface 260 instead of going through the code. Graphical user interface 260 automates the setting of breakpoints. For example, the user can first simplify the program slice graph through collapsing and pruning of nodes so that the new graph has only a few links that user wishes to test. After simplification, the user can direct the graphical user interface 260 to instrument (for debugging checks) the links in the simplified graph. A binding is maintained between a program slice as lines of code and the directed graph. The system uses that binding to instrument the code properly.

Performance Tuning

Graphical user interface 260 applies domain-specific knowledge to performance analysis through an event abstraction mechanism that is useful for identifying performance bottlenecks without entangling the programmer in minute details of performance analysis.

Often, the volume of performance data to be displayed is much higher than the amount of information a human observer can comprehend. This is especially so in a parallel-processing environment with a large number of processors. An event abstraction mechanism uses domain-specific knowledge to create and track high-level events that are closer to the semantic structure of the program. Using this mechanism, graphical user interface 260 replaces some of the lower-level events with higher-level events. The number of events is decreased, thus resulting in the streamlining of performance data. Furthermore, bringing the events closer to the semantic structure of the program being analyzed facilitates the user's comprehension of the performance data.

Graphical user interface 260 draws high-level events from a specific application domain. In one embodiment, they are based on either the underlying physics and dynamics or the template for a numerical method. Consider, for example, an application based on the finite element method (FEM). The FEM includes the following stages of computation: (i) calculation of the local element matrices, (ii) assembly of the global matrix, (iii) solution of a sparse linear system of equations, and (iv) calculation of the physical field. An event is associated with the execution of a particular stage of computation. It is more meaningful for the user to think in terms of such high-level events. For instance, the third stage (linear solver) is expected to dominate as the problem size becomes large. But, for a given range of problem sizes, the asymptotic behavior may not be observed. The crossover point where the asymptotic behavior sets in can vary considerably depending on a various factors including programming practices. By observing the performance behavior of each stage and the crossover point, the user can draw meaningful conclusions about the performance bottlenecks without becoming entangled in minute details of performance.

As another example, an event can be used to represent the execution of those parts of the code responsible for performing computations to simulate a particular physical phenomenon (in one embodiment computations to simulate a cloud in a climate model). The user can expect certain load imbalance based on the occurrence of the particular physical phenomena. The user can track performance of the associated event to study the load imbalance. Often the legacy codes are large and so complex that it is difficult for the user to identify all the parts of the code for processing a particular physical phenomenon. Program slice browser 268 solves these problems, as further described below.

In one embodiment, an event abstraction mechanism has three components: (a) a graphical tool for the user to specify a high-level event, (b) an instrumentation facility that takes the input from the user and inserts instrumentation into the source-code to record performance data, and (c) a visualization tool customized to show the performance results for high-level events.

A high-level event is specified by either a set of user-defined code segments or by markers. But, insertion of instrumentation calls can easily become very tedious and time-consuming. In some instances, it may be very difficult for a user to identify the parts of the code for performing computations to simulate a particular physical phenomenon. It is especially a problem when dealing with legacy codes because they are complex and sometimes not well organized. Program slice browser 268 solves this problem. The user can identify the output variables used to store the result of computation for simulating the physical phenomenon. By using the backward slicing mechanism with those output variables, the user can get the relevant parts of the program for that computation. In one embodiment, program slice browser 268 identifies the subroutines involved in a particular computation, and the user can choose to mark those subroutines as a high-level event.

Cross-Referencing Capability

BLAST viewer 264, controller 265, code browser 266, program slice browser 268, and template viewer 269 work together to provide a cross-referencing capability that relates together different views of the source code to improve navigation, code understanding, debugging, and performance monitoring. An example of this cross-referencing capability is the feature of relating a variable access to a control block. As previously described above, the code browser allows the user to track read/write accesses to a selected variable. But, it is often more meaningful to relate these accesses to the associated control block. For instance, it is more useful to know that the variable is first checked (read) in an "if statement" and then modified (written) in a "do loop" as opposed to simply knowing that there is a read access in one place followed by a write access in another place within the program. But the user needs assistance in finding the control block associated with a variable reference because it is difficult to identify control structures within a program when a control statement spans across several lines or pages of a program.

The cross-referencing capability provides a solution to this problem. The user opens a code browser window and the BLAST viewer window. While tracing a variable through code browser 266, the user clicks on a statement where the variable is used. The control block containing that statement is highlighted in the BLAST viewer window, so that the user can relate the access to the control block. The cross-referencing capability is also used for debugging.

The cross-referencing capability has three views: one view to browse the code, a second view to observe the structure of the code, and a third view for observing the performance results. Within a given view, there can be multiple types of displays. For example, the structural view could be either a BLAST or a call-order tree. The user is provided with a convenient mechanism that allows various facilities including switching the displays or moving from one view to another.

Code Instrumentation Capability

BLAST viewer 264, code browser 266, and program slice browser 268 work together to provide code instrumentation, which assists in code debugging and performance monitoring. For example, the user may identify a "do loop" through BLAST viewer 264 as a critical part of the program that needs to be timed, for example to identify the amount of time spent on execution of the loop as the problem size is varied. The user can select the loop and through BLAST viewer 264 direct the system to instrument the code for collecting timing information. The cross-referencing capability is used implicitly for instrumenting the code.

Template Viewer

Template viewer 269 enables knowledge-based software visualization. The template consists of abstract data structures and logical events. It allows the user to view the binding between the domain-specific template and the code as further described below with reference to FIG. 6. Note that this binding is done during the diagnostic phase. Template viewer 269 is also useful in two other ways: semantic abstraction and code instrumentation to support semantic-level debugging and performance analysis as follows:

1. Semantic abstractions are based on either abstract data structures or logical events that are identified through a domain-specific template. The user clicks on an abstract data structure seen through a display window of template viewer 269. Then, all the nodes in the program slice diagram that correspond to modifications of components of this abstract data structure are grouped together as one single node. This new node is labeled with the name of the abstract data structure. Another semantic abstraction is based on logical events. The user clicks on a logical event seen through the display window of template viewer 269. Then, all the nodes in the program slice diagram that correspond to statements or subroutine calls that are bound to the specified logical event are grouped together as one single node. This new node is labeled with the name of the logical event. Note that semantic abstractions simplify the program slice diagram and provide more useful information, so that the user can relate the program slice diagram to meaningful data structures and/or logical events.

2. Template viewer 269 is useful to instrument code to support semantic-level debugging and performance analysis.

Information repository 274 contains information obtained from analysis of serial code 286 that will be needed by other modules. Examples of information included in information repository 274 include read-write information, data-declaration information, program structure information, and caller-callee information. Read-write information consists of the names of variables that are read from, the names of variables that are written to, and the subscription information for each use of array variables. Data-declaration information consists of the definitions for variables and their dimensions if they are array variables. Program structure information consists of an identification of the start and end of control constructs, such as "if-then-else" statements, "DO" loops, and subroutine calls. Caller-callee information consists of the name of the procedure being called and the actual arguments being passed to the procedure. Information manager 276 manages the use of information repository 274 by the other modules.

Serial code 286 contains instructions to be executed by processor 240 in order, one after another until the code completes. Parser 278 parses serial code 286 and generates information necessary for the other modules.

Diagnostics 280 verifies that the serial program being examined is consistent with a specified computation model and points out the violations and probable reasons for the violations.

Analysis module 282 does program analysis and code restructuring. The analysis incorporates both compiler and rule-based techniques. Its distinctive feature is the capability to customize and optimize analysis based on domain-specific knowledge. Many re-engineering problems, including parallelization, are intractable with a purely syntactic analysis. The rule-based techniques encapsulate the knowledge used by human experts to solve the problem.

Transformation module 284 generates parallel code 288 based on the outputs of parser 278, diagnostics 280, and analysis 282 and re-engineers the input code by a series of transformation. Transformation module 284 provides three types of transformations: parallelization, coupling of models, and restructuring to improve performance and/or organization of the code. Transformation module 284 generates a transformation log so that the user can understand and keep track of the changes made to the code.

Parallel code 288 contains instructions to be executed in parallel, that is parallel code 288 is divided into multiple segments, each of which can be executed in parallel without regard to when the other segments start or complete. Parallel code 288 can be executed in parallel on processor 240 or on multiple unillustrated processors. Graphical user interface 260 is used to understand and debug parallel code 288. In another embodiment, graphical user interface 260 is not restricted to a type of code; for example, graphical user interface 260 can be used to understand and debug serial code 286.

Processor 240 executes instructions and includes that portion of computer 110 that controls the operation of the entire computer system, including executing the arithmetical and logical functions contained in a particular computer program. Although not depicted in FIG. 2, processor 240 typically includes a control unit that organizes data and program storage in a computer memory and transfers data and other information between the various part of the computer system. Processor 240 accesses data and instructions from and stores data to memory 230. Any appropriate processor can be utilized for processor 240. Although computer 110 is shown to contain only a single processor and a single system bus, the present invention applies equally to computer systems that have multiple processors and to computer system that have multiple buses that each performs different functions in different ways.

Diskette drive 122 and hard disk drive 123 are electromechanical devices that read from and write to magnetic disks, although any non-volatile storage devices can be used. The main components of a disk drive are a spindle on which the disk is mounted, a drive motor that spins the disk when the drive is in operation, one or more read/write heads that perform the actual reading and writing, a second motor that positions the read/write heads over the disk, and control circuitry that synchronizes read/write activities and transfers information to and from computer 110. A disk itself is typically a round, flat piece of flexible plastic (e.g. floppy disk) or inflexible metal (e.g., hard disk) coated with a magnetic material that can be electrically influenced to hold information recorded in digital form. A disk is, in most computers, the primary method for storing data on a permanent or semi-permanent basis.

CD-ROM drive 124 is an electromechanical device that reads from and/or writes to optical media. In one embodiment, CD-ROM drive 124 is capable of reading information only. In another embodiment, drive 124 is capable of both reading and writing information. The media that is read and/or written by CD-ROM drive 124 is typically a disk-shaped piece of flexible plastic and/or metal coated with both reflective and non-reflective surfaces, so as to hold information recorded in digital form.

Finally, computer 110 includes network adapter 252, which facilitates communication between computer 110 and network 160, which might be a local area network (LAN), an intranet, or the Internet. Network 160 provides a user of computer 110 with a means of electronically communicating information, including software, with a remote computer or a network logical-storage device. In addition, in one embodiment, network 160 supports distributed processing, which enables computer 110 to share a task with other computer systems linked to the network.

In another embodiment, network adapter 252 is a modem, which supports communication between computer 110 and another computer system over a standard telephone line. Furthermore, through a modem, computer 110 can access other sources such as server, an electronic bulletin board, and the Internet or World Wide Web.

Network 160 may include a plurality of networks, each of which could include a plurality of individual computers. Network 160 and server 188 can be located a great geographic distance from computer 110, or they can be in the same room or even on the same desktop. Computer 110 can be connected to network 160 via a standard telephone line, a dedicated cable, or a wireless communications link. In another embodiment, computer 110 is a stand-alone system not connected to a network.

The configuration depicted in FIG. 1 is but one possible implementation of the components depicted in FIG. 2. Portable computers, laptop computers, and network computers or Internet appliances are other possible configurations. The hardware depicted in FIG. 2 may vary for specific applications. For example, other peripheral devices such as audio adapters or chip programming devices, such as PAL or EPROM programming devices may be used in addition to or in place of the hardware already depicted. Thus, an embodiment of the invention can apply to any hardware configuration that allows a display of program slice diagrams, regardless of whether the hardware configuration is a complicated, multi-user computing apparatus, a single-user workstation, or a network appliance that does not have non-volatile storage of its own.

As will be described in detail below, aspects of an embodiment pertain to a method implementable on computers. In another embodiment, the invention can be implemented as a computer program product for use with a computer system. The programs defining the functions of the embodiment can be delivered to a computer via a variety of signal-bearing media, which include, but are not limited to:

(1) information permanently stored on non-writeable storage media (e.g., read-only memory devices within a computer such as CD-ROM disks) readable by CD-ROM drive 124;

(2) alterable information stored on writeable storage media (e.g., floppy disks within diskette drive 122, CD-ROM drive 124, or hard-disk drive 123); or (3) information conveyed to a computer by a communications media, such as through a computer or telephone network including wireless communications.

Such signal-bearing media, when carrying computer-readable instructions that direct the functions of the present invention, represent embodiments of the present invention.

Figure 3:
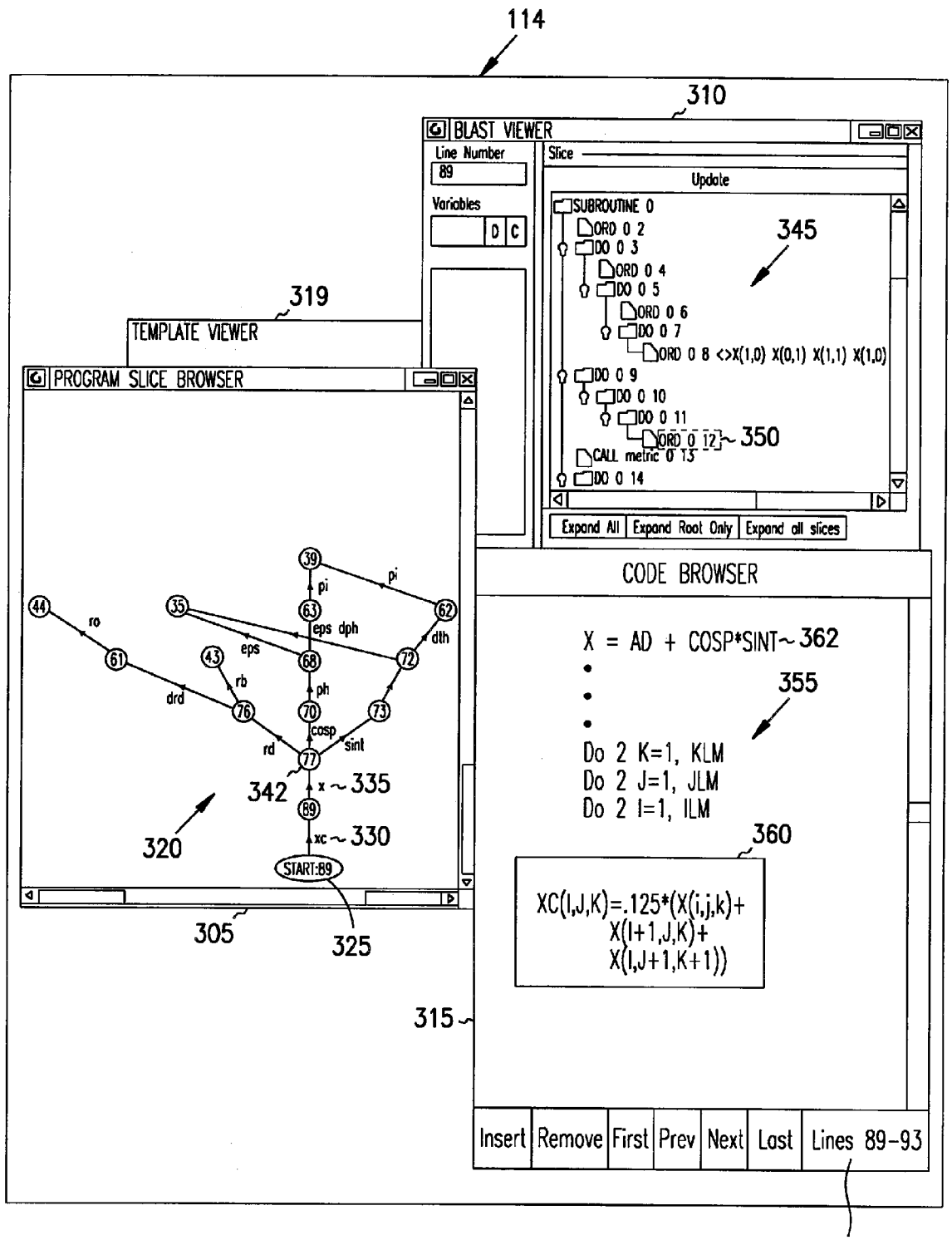
FIG. 3 depicts a pictorial representation of an example of the screens from a program slice browser, a code browser, a template viewer, and a Block-Level Abstract Syntax Tree viewer, according to an embodiment of the invention.

FIG. 3 depicts a pictorial representation of an example of the screens displayed by BLAST viewer 264, code browser 266, program slice browser 268, and template viewer 269, according to an embodiment of the invention. Examples of program slice browser window 305, BLAST viewer window 310, and code browser window 315, and template viewer window 319 are shown displayed on display device 114. Program slice browser window 305 contains program slice diagram 320, which includes nodes and arcs between the nodes. In a program slice diagram, the nodes represent either statements or blocks. The label of a statement node represents the line number of the statement, e.g., 89. As shown in FIG. 5, the label of a block or a compounded block represents the block type and the line numbers of the start point and the end point, e.g., DO[89, 93]. The directed edge a→b represents node a, which depends on node b because there is at least one variable, c, which is read in node a, and the value can be written in node b. The label of edge represents the dependable variables, e.g., c.

In the example shown in program slice browser window 305, root node 325 represents the first statement of the code being represented. In this example, statement 89 is the first statement. Arc 330 indicates that variable XC is receiving a value at statement 89, which can be seen by cross reference to code block 360 in code browser window 315. Arc 335, labeled with the variable "X," and node 342, labeled with statement number 77, indicate that variable XC at statement number 89 has a data flow dependency on variable X, which is set to some value at statement 77, which can be seen by cross reference to statement 362 in code browser window 315.

To help the user to easily understand the program, a neat layout of the program slice diagram is necessary. Consequently, in one embodiment two alternative layout algorithms are used. The first layout method is called multi-column layout. This layout maintains the position of nodes as they are in the source code. For instance, node 342 represents the statement at line 77, and node 325 represents the statements at lines 89–93. Thus, in the multi-column layout, program slice browser 268 displays node 342 closer to the top of screen than node 325. Users thus can have a perception of the slice's relative positions in the source code. In multi-column layout, the node of the program slice diagram is arranged in lines, attempting to keep the nodes and the edges from overlapping with each other. The column is the maximum number of nodes allowed to display in a line. When the value of column is increased, the graph will be spread and overlapping will be reduced. A column increment toolbar is provided for the user, and the user can tell program slice browser 268 how many columns are necessary.

The second layout method is called upside-down-tree layout, which is shown in program slice diagram 320. In this method, a node is displayed according to its position in the data flow instead of the source code. A breadth-first search (BFS) is applied to the program slice diagram. The nodes are arranged in the search orders. The bottom node is the point where the program slice starts, and the top node is the point where the program slice ends in the current subroutine. The diagram is displayed like an upside-down tree. To enhance the effect, three parameters are used in the tree layout algorithm.

Parameter width, which is used to determine the unit space between nodes in a line.

Parameter height, which is used to determine the space between lines. In the toolbox of the browser, the user can determine the parameter s width and height at will.

Parameter spread factor. Because the program slice diagram basically is a graph, there can be edges connected between nodes in different lines (due to different BFS orders).

The diagram is displayed in a "fan," which means that the higher the line the wider the horizontal distance between nodes. In this way, overlap between nodes and edges is reduced. Spread factor is used to obtain this effect. The distance between the nth level nodes is calculated by the following formula where the bottom node is at the 1st level.

Distance at nth level=width*(spread factor)$^{n-1}$

Spread factor is a predetermined constant. In one embodiment, a value of 1.2 is used as the spread factor.

BLAST viewer window 310 shows the code structure by displaying code control blocks 345. BLAST viewer window 310 includes highlighted code block 350 as a cross reference to code block 360 in code browser 315, which is the code block of root node 325 in program slice browser window 305.

Code browser window 315 includes code 355, code block 360, statement 362, and statement numbers 365. Code block 360 is surrounding by a box to indicate that it is associated with root node 325 in program slice browser window 305. Statement 362 is the statement associated with node 342 and arc 335 in program slice diagram 320 of program slice browser window 305. Statement numbers 365 indicate the statement numbers associated with code block 360.

The contents of template viewer window 319 are further described below with reference to FIG. 6.

Figure 4:
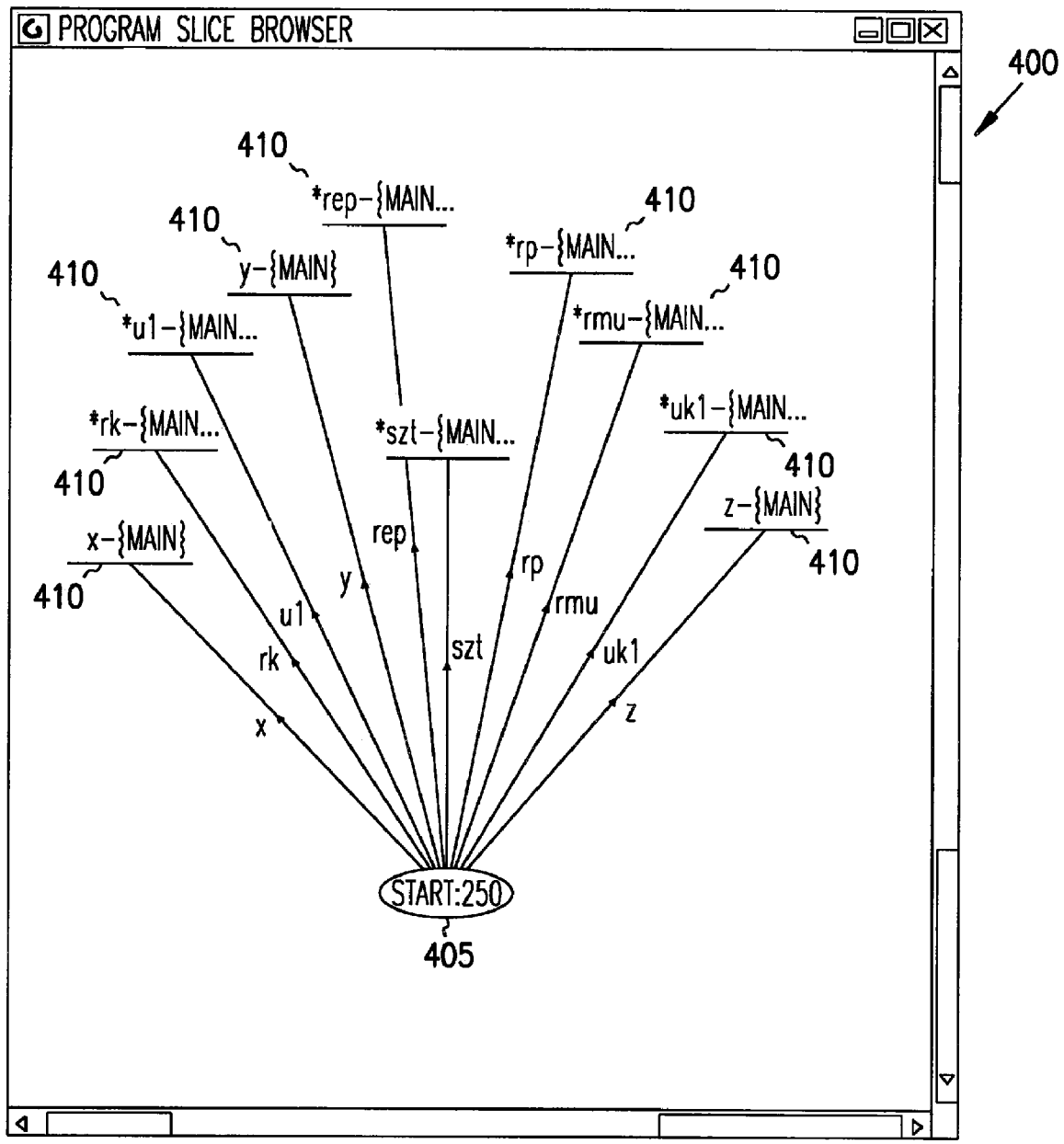
FIG. 4 depicts a pictorial representation of an example screen of the program slice browser showing procedure-level abstractions.

FIG. 4 depicts a pictorial representation of example program slice browser window 400 showing procedure-level abstractions. Program slice browser 268 created window 400 in response to the user selecting a procedure-level abstraction button on the user interface, as further described below with reference to FIG. 5. Referring again to FIG. 4, browser window 400 contains node 405, which is the root node. Node 405 is labeled with 250, which is the statement number associated with the root node. Browser window 400 also contains multiple procedure nodes 410, which are all labeled with the MAIN procedure name. Browser window 400 tells the user which procedures contribute to the value assigned at statement 250. In this example, all influential variables are coming from the MAIN procedure. Thus, programmer can ignore other procedures and concentrate on the MAIN procedure only.

Figure 5:
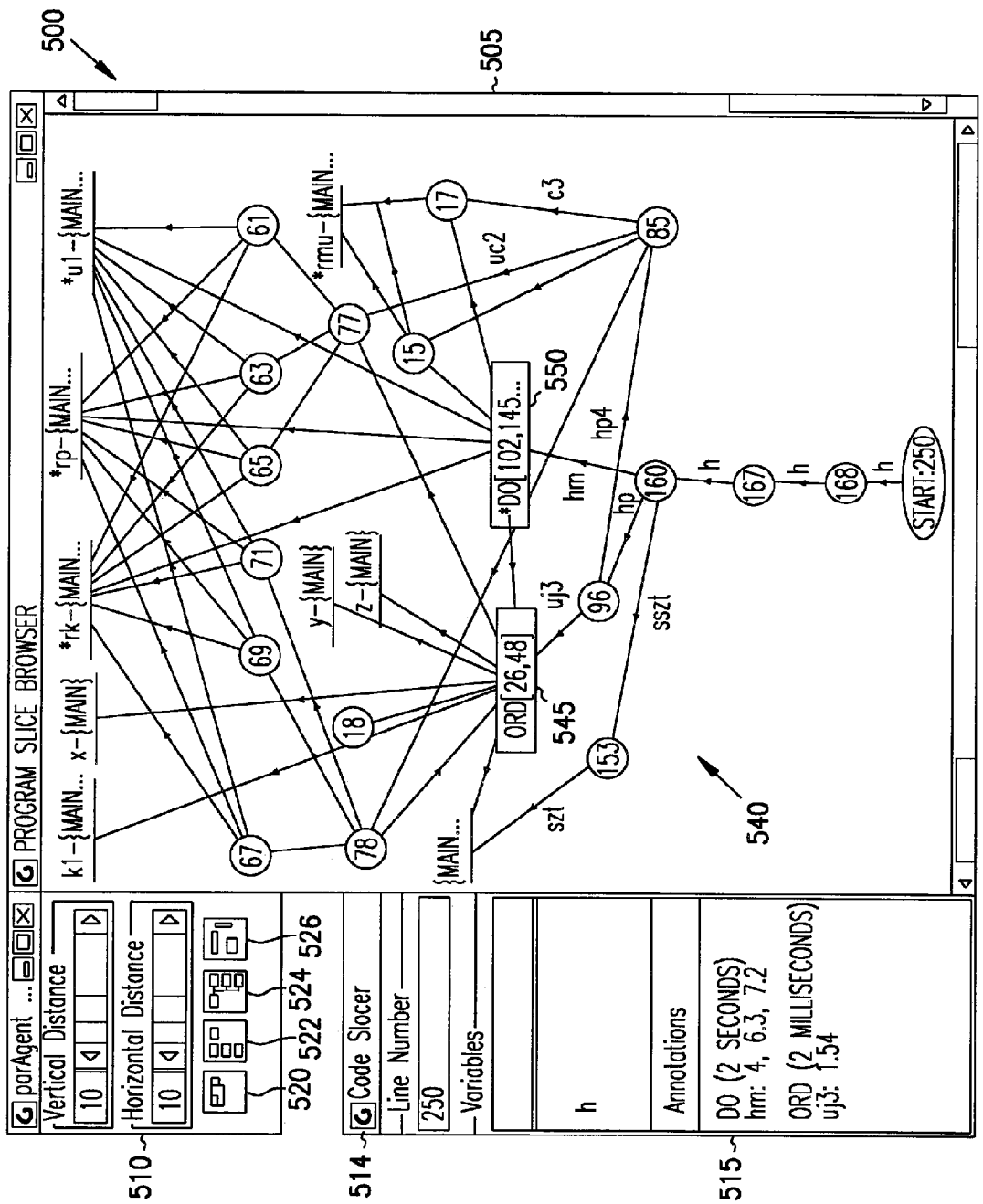
FIG. 5 depicts a pictorial representation of an example screen of the program slice browser showing block-level abstractions with data annotations.

FIG. 5 depicts a pictorial representation of program slice browser window 500, showing block-level abstractions with data annotations. In program slice browser window 500, three components of program slice browser 268 are presented: main window 505, toolbox 510, and slice control window 514. In main window 505, program slice diagram 540 is displayed in upside-down tree layout. Block abstractions 545 and 550 are illustrated.

Toolbox window 510 allows user to determine the diagram's width and height. Plus, toolbox window 510 accommodates four buttons: recovery button 520, procedure-level abstraction button 522, block-level abstraction button 524, and elimination button 526, which supply the user interface for the abstractions previously described above with reference to FIG. 2. The user selected block-level abstraction button 524 to create browser window 500.

Referring again to FIG. 5, slice control window 514 indicates that program slice diagram 540 represents the program slice of variable h starting from line number 250. Slice control window 514 also contains annotations 515, which indicates the time spent in each of blocks 545 and 550 and the values of variables hm and uj3 during the course of execution of the program.

Figure 6:
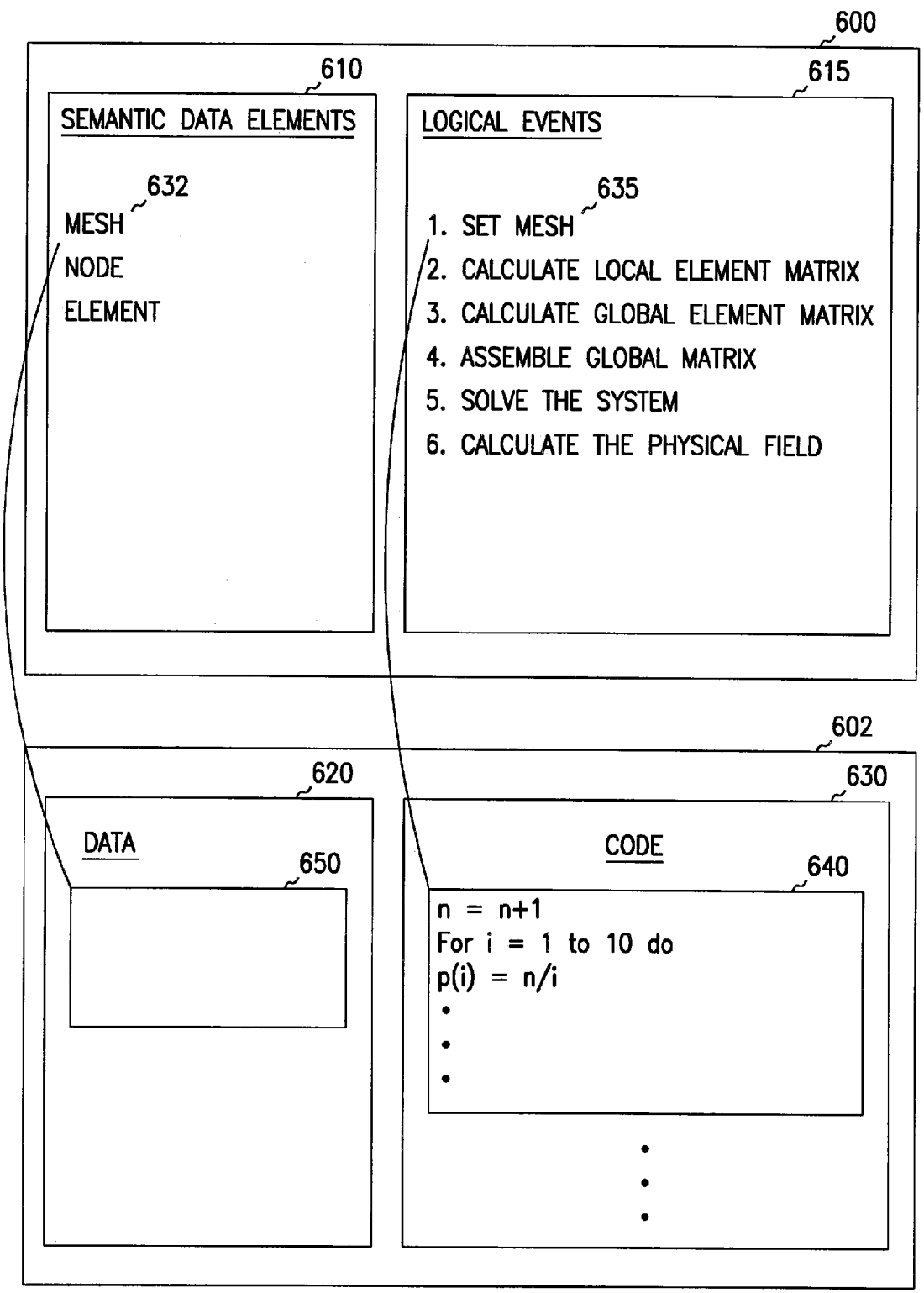
FIG. 6 depicts a pictorial representation of an example of the screens of the domain-specific template viewer and the code browser showing semantic abstractions.

FIG. 6 depicts a pictorial representation of example template viewer window 600 of template viewer 269 and code browser window 602 of code browser 266 showing semantic abstractions. Window 600 includes semantic data elements 610 and logical events 615. Window 602 includes data 620 and code 630. Template viewer 269 analyzes the code, finds logical relationships among the data, and displays semantic data elements 610 showing semantic abstractions of data structures. In the example shown, mesh 632, node, and element are the semantic abstractions of the data structures. Semantic data elements 610 are cross-referenced into data 620, so that the user can see the relationship between the semantic abstractions and the actual data. In the example shown, mesh 632 is cross-referenced to its associated data 650. Template viewer 269 analyzes the code, finds logical relationships among the code, and displays logical events 615 showing semantic abstractions of the code. Logical events 615 includes the semantic abstractions of set mesh 635, calculate local element matrix, calculate global element matrix, assemble global matrix, solve the system, and calculate the physical field. Logical events 615 are cross-referenced into code 630, so that the user can see the relationship between the semantic abstractions of the code and the actual code. In the example shown, set mesh 635 is cross-referenced to its associated code 640.

Figure 7:
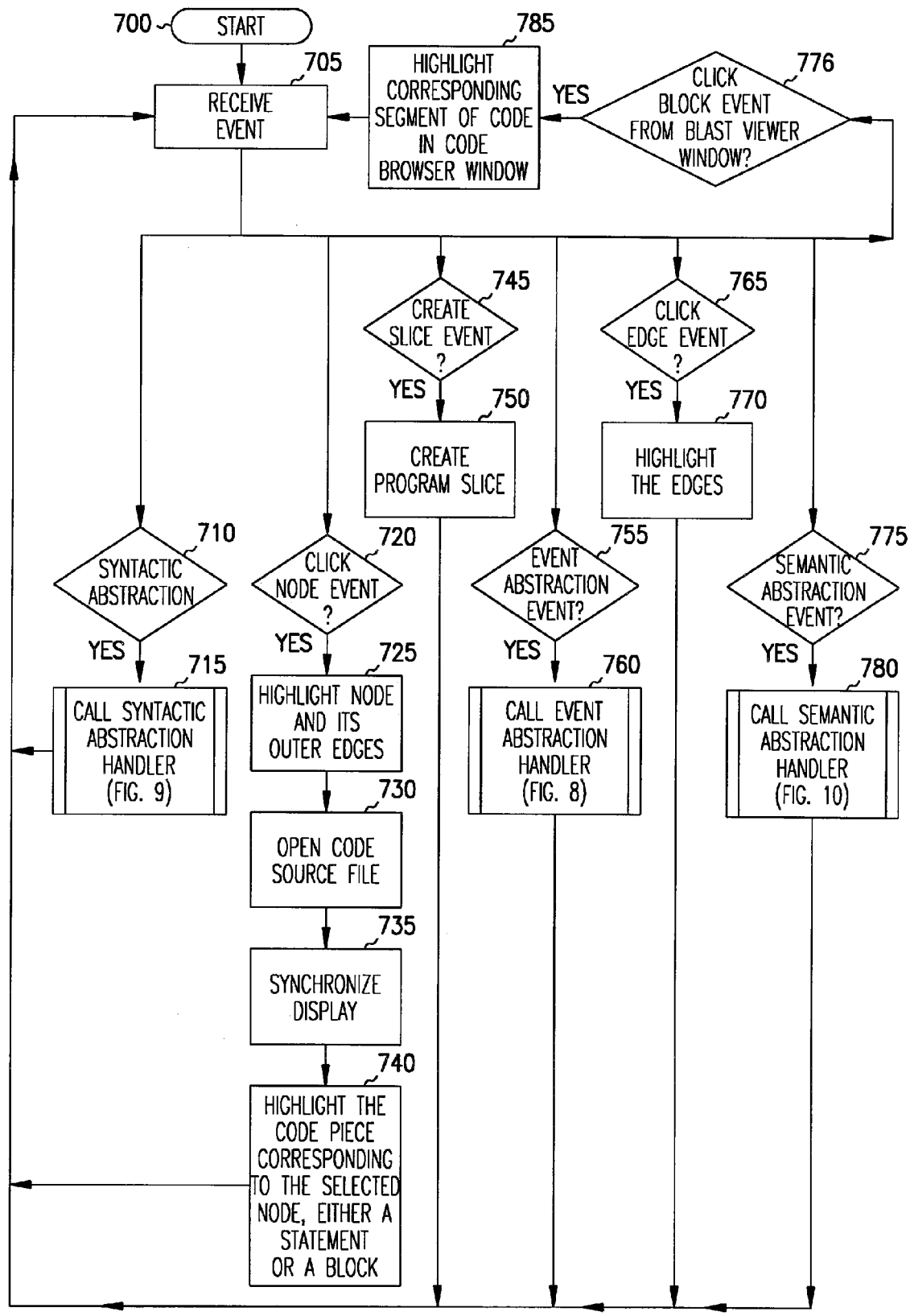
FIG. 7 depicts an example flowchart that describes the operation of the graphical user interface as it responds to user selections, according to an embodiment of the invention.

FIG. 7 depicts an example flowchart that describes the operation of graphical user interface 260 as it responds to user requests, according to an embodiment of the invention. Control starts at block 700. Control then continues to block 705 where graphical user interface 260 receives a user-interface event, which in one embodiment is a message. Control then continues to one of block 710, 720, 745, 755, 765, 775, or 776, depending on whether the event received is a syntactic abstraction event, a click node event, a create slice event, an event abstraction event, a click edge event, a semantic abstraction event, or a click block event, respectively.

If the event received at block 705 is a syntactic abstraction event, then control continues to block 710. Control then continues to block 715 where the syntactic abstraction handler is called, as further described below with reference to FIG. 9. Control then returns to block 705, as previously described above.

If the event received at block 705 is a click node event, then control continues to block 720. Control then continues to block 725 where program slice browser 268 highlights the selected node and its edges in the program slice browser window.

Control then continues to block 730 where program slice browser 268 opens the source-code file containing the code being analyzed. Control then continues to block 735 where the contents of the program slice browser window are synchronized with the contents of the source code. Control then continues to block 740 where code browser 266 highlights the code piece corresponding to the selected node. The code piece can be either a statement or a block. Control then returns to block 705, as previously described above.

If the event received at block 705 is a create slice event, then control continues to block 745. Control then continues to block 750 where program slice browser 268 creates the program slice displayed in the program slice browser window based on the selected variable and the information contained in information repository 274. Control then returns to block 705, as previously described above.

If the event received at block 705 is an event abstraction event, then control continues to block 755. Control then continues to block 760 where the event abstraction handler is called, as further described below with reference to FIG. 8. Control then returns to block 705, as previously described above.

If the event received at block 705 is a click edge event, then control continues to block 765. Control then continues to block 770 where program slice browser 268 highlights the selected edge in the program slice browser window. Control then returns to block 705, as previously described above.

If the event received at block 705 is a semantic abstraction event, then control continues to block 775. Control then continues to block 780 where the semantic abstraction handler is called, as further described below with reference to FIG. 10. Control then returns to block 705, as previously described above.

If the event received at block 705 is a click block event from the BLAST viewer window, then the user has selected a block within the BLAST viewer window, so control continues to block 776. Control then continues to block 785 where BLAST viewer determines which lines of code correspond to the selected block and communicates this information to code browser 266 via controller 265. Code browser 266 then highlights the corresponding lines of code in the code browser window. In this way, graphical user interface 260 provides a cross reference between the BLAST viewer window and the code browser window. Control then returns to block 705, as previously described above.

Figure 8:
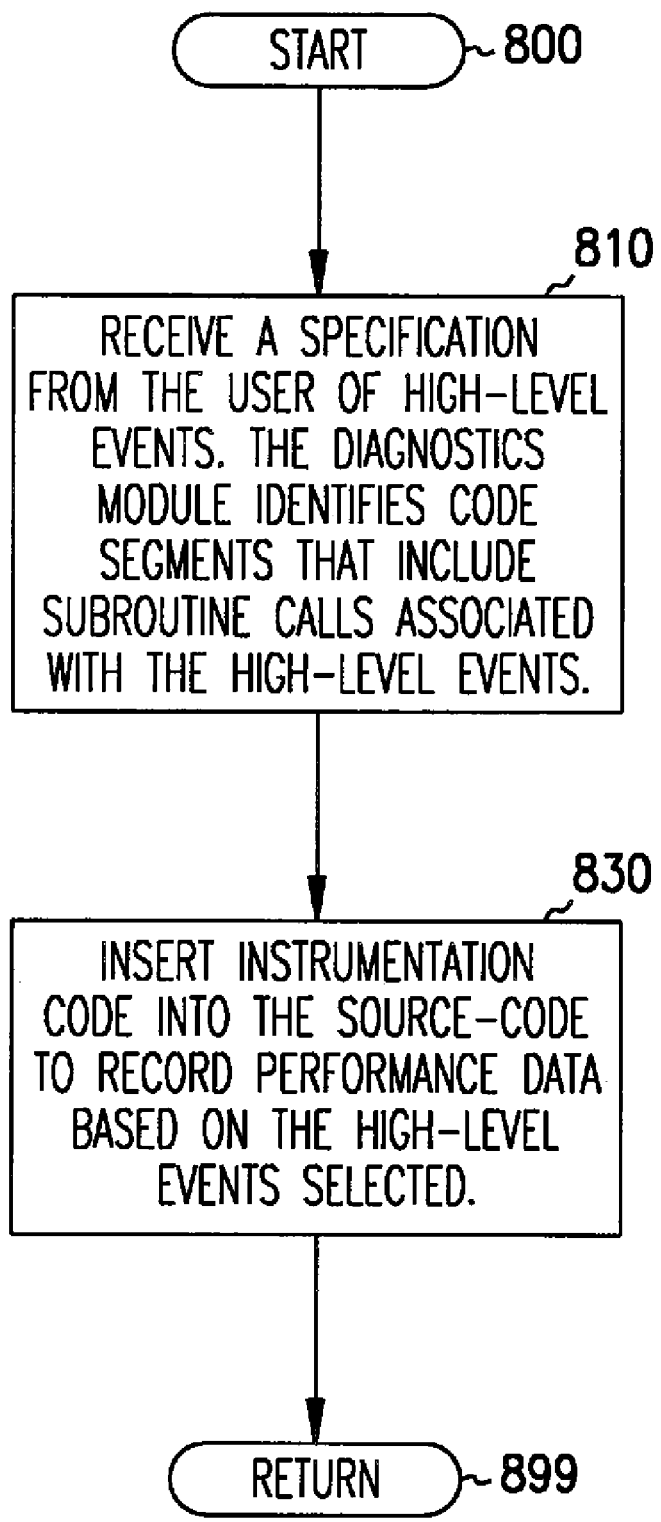
FIG. 8 depicts an example flowchart that describes the operation of the program slice browser as it inserts instrumentation code, according to an embodiment of the invention.

FIG. 8 depicts an example flowchart that describes the operation of program slice browser 268 as it inserts instrumentation code, according to an embodiment of the invention. Control begins at block 800. Control then continues to block 810 where program slice browser 268 receives a specification from the user of high-level events. Diagnostics module 280 identifies code segments that include subroutine calls associated with the high-level events. Control then continues to block 830 where program slice browser 268 inserts instrumentation code into the source-code to record performance data based on the high-level events selected. The performance data is collected when the code executes. Control then continues to block 899 where the function returns.

Figure 9:
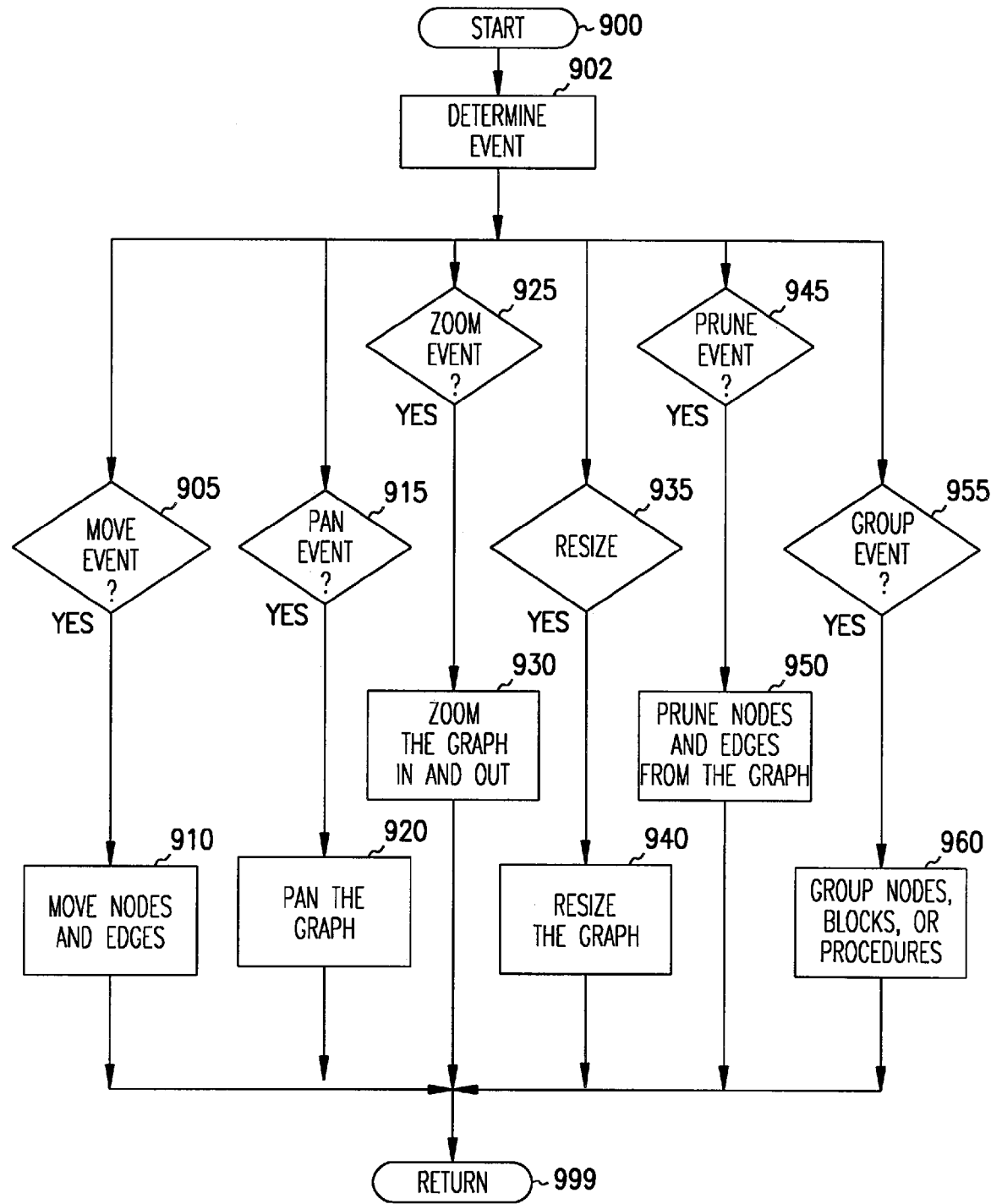
FIG. 9 depicts an example flowchart that describes the operation of the program slice browser as it handles syntactic abstractions, according to an embodiment of the invention.

FIG. 9 depicts an example flowchart that describes the operation of program slice browser 268 as it handles syntactic abstractions, according to an embodiment of the invention. Control begins at block 900. Control then continues to block 902 where program slice browser 268 determines which event the user initiated. Control then continues to one of blocks 905, 915, 925, 935, 945, or 955, depending on whether the user initiated a move event, pan event, zoom event, resize event, prune event, or group event, respectively. If the user initiated a move event, then control continues from block 902 to block 905 and on to block 910 where program slice browser 268 moves the nodes and edges of the graph as selected by the user. Control then continues to block 999 where the function returns.

If the user initiated a pan event, the control continues from block 902 to block 915 and on to block 920 where program slice browser 268 pans the graph. Control then returns to block 902, as previously described above.

If the user initiated a zoom event, then control continues from block 902 to block 925 and on to block 930 where program slice browser 268 zooms the diagram in or out, effectively making the diagram larger or smaller. Control then continues to block 999 where the function returns.

If the user initiated a resize event, then control continues from block 902 to block 935 and on to block 940 where program slice browser 268 resizes the diagram. Control then continues to block 999 where the function returns.

If the user initiated a prune event, then control continues from block 902 to block 945 and on to block 950 where program slice browser 268 prunes part of the diagram by deleting from the display a selected subgraph of the diagram. Control then continues to block 999 where the function returns.

If the user initiated a group event, then control continues from block 902 to block 955 and on to block 960 where program slice browser 268 groups nodes, blocks, or procedures. Control then continues to block 999 where the function returns.

Figure 10:
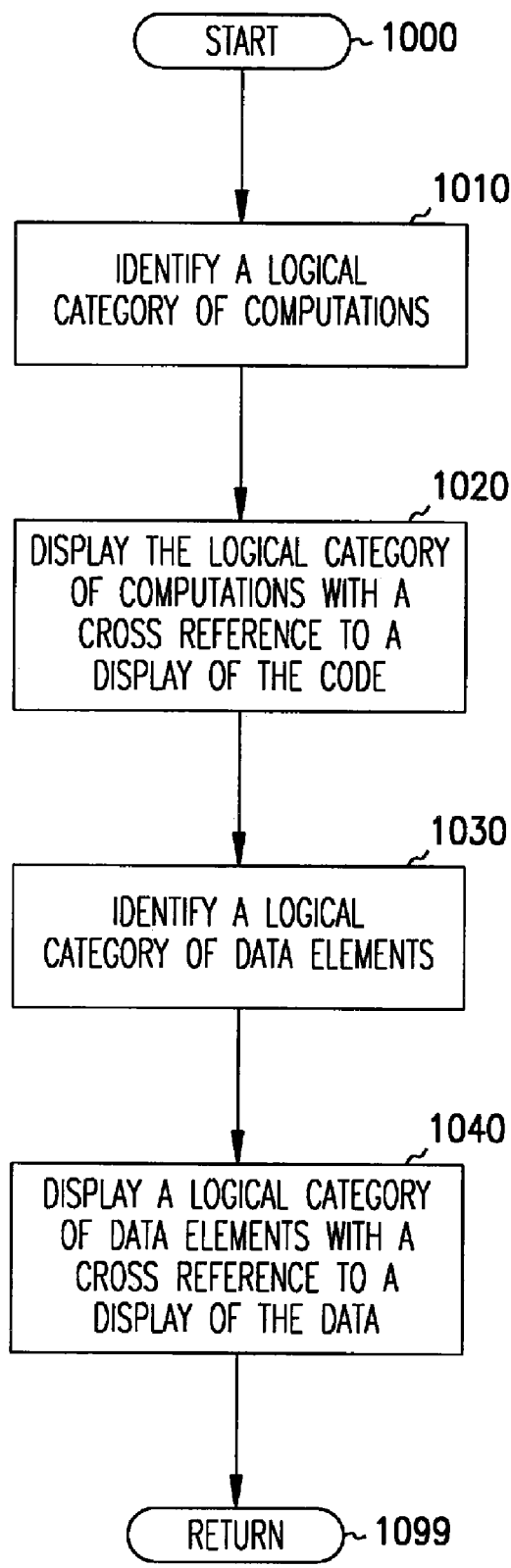
FIG. 10 depicts an example flowchart that describes the operation of the program slice browser as it handles semantic abstractions, according to an embodiment of the invention.

FIG. 10 depicts an example flowchart that describes the operation of BLAST viewer 264 as it handles semantic abstractions, according to an embodiment of the invention. Control begins at block 1000. Control then continues to block 1010 where BLAST viewer 264 identifies a logical category of computations by analyzing the source code. Control then continues to block 1020 where BLAST viewer 264 displays the logical category of computations with a cross-reference to a display of the source code. Control then continues to block 1030 where BLAST viewer 264 identifies a logical category of data elements. Control then continues to block 1040 where BLAST viewer 264 displays the logical category of data elements with a cross reference to a display of the data. Control then continues to block 1099 where the function returns.

What is claimed is:

1. A computer-implemented method, comprising:
    analyzing source code to determine a program slice;
    creating a program slice diagram that provides a graphical representation of the program slice;
    displaying the program slice diagram;
    displaying a code browser operable to display a subset of the source code;
    displaying a Block Level Abstract Syntax Tree (BLAST) viewer having one or more control blocks;
    determining a cross-reference between the program slice diagram, a control block in the one or more control blocks, a portion of subset of the source code; a node of a plurality of nodes in the program slice diagram; and
    indicating the cross reference in the code browser, the BLAST viewer and the program slice diagram.

2. The method of claim 1, wherein the program slice diagram further comprises a directed graph comprising a plurality of nodes and arcs, wherein the arcs represent data flow dependencies between the nodes.

3. The method of claim 2, wherein the nodes represent source code statements within a selected subroutine.

4. The method of claim 2, wherein the nodes represent variable references outside of a selected subroutine.

5. The method of claim 2, further comprising:
    simplifying the program slice diagram by retaining only those nodes that correspond to variable references outside of a selected subroutine.

6. A computer-implemented method, comprising:
    displaying a template viewer, said template viewer operable to receive semantic information;
    performing semantic abstraction to group a subset of nodes together based on the semantic information;
    analyzing source code to determine a program slice using the subset of nodes;
    creating a program slice diagram that provides a graphical representation of the program slice; and
    displaying the program slice diagram.

7. The method of claim 6, further comprising:
    identifying a logical category of computations; and
    displaying the logical category of computations with a cross-reference to a display of the source code.

8. The method of claim 6, wherein performing semantic abstraction further comprises:
    identifying a logical category of data elements; and
    displaying the logical category of data elements with a cross-reference to a display of data.

9. The method of claim 6, wherein the semantic information comprises a logical event, and wherein performing semantic abstraction includes collapsing together nodes that correspond to the logical event.

10. A storage medium comprising computer-readable instructions, wherein the instructions when read and executed by a computer comprise:
    analyzing source code to determine a program slice;
    creating a program slice diagram that provides a graphical representation of the program slice;
    displaying the program slice diagram;
    displaying a code browser operable to display a subset of the source code;
    displaying a Block Level Abstract Syntax Tree (BLAST) viewer having one or more control blocks;
    determining a cross-reference between the program slice diagram, a control block in the one or more control blocks, a portion of subset of the source code; a node of a plurality of nodes in the program slice diagram; and
    indicating the cross reference in the code browser, the BLAST viewer and the program slice diagram.

11. The storage medium of claim 10, wherein the program slice diagram further comprises a directed graph comprising a plurality of nodes and arcs wherein the arcs represent data flow dependencies between the nodes.

12. The storage medium of claim 11, wherein the nodes represent source code statements within a selected subroutine.

13. The storage medium of claim 11, wherein the nodes represent variable references outside of a selected subroutine.

14. The storage medium of claim 10, further comprising:
    simplifying the program slice diagram by retaining only those nodes that correspond to variable references that are outside of a selected subroutine.

15. A storage medium comprising computer-readable instructions, wherein the instructions when read and executed by a computer comprise:
- displaying a template viewer, said template viewer operable to receive semantic information;
- performing semantic abstraction to group a subset of nodes together based on the semantic information;
- analyzing source code to determine a program slice using the subset of nodes;
- creating a program slice diagram that provides a graphical representation of the program slice; and
- displaying the program slice diagram.

16. The tangible computer-readable media of claim 15, further comprising:
- identifying a logical category of computations; and
- displaying the logical category of computations with a cross-reference to a display of the source code.

17. The tangible computer-readable media of claim 15, wherein performing semantic abstraction further comprises:
- identifying a logical category of data elements; and
- displaying the logical category of data elements with a cross-reference to a display of data.

18. The storage medium of claim 15, wherein the semantic information comprises a logical event, and wherein performing semantic abstraction includes collapsing together nodes that correspond to a logical event.

19. A software visualization environment for visualizing source code, comprising:
- a code browser to display source code;
- a block-level abstract syntax tree viewer;
- a program slice browser to display a program slice as a directed graph comprising a plurality of nodes;
- a template viewer; and
- a controller that cross-references information between the code browser, the block-level abstract syntax tree viewer, the program slice browser, and the template viewer.

20. The software visualization environment of 19, wherein the code browser further:
- displays line numbers that cross reference to other visualization components.

21. The software visualization environment of claim 19, wherein the program slice browser further:
- displays the directed graph in upside-down-tree layout, wherein the nodes are positioned according to a data-flow pattern.

22. The software visualization environment of claim 19, wherein the template viewer further:
- displays a binding between a logical view of the source code and the source code.

23. The software visualization environment of claim 22, wherein the binding comprises a template, comprising:
- abstract data structures; and
- logical steps that manipulate the abstract data structures.

* * * * *

UNITED STATES PATENT AND TRADEMARK OFFICE
CERTIFICATE OF CORRECTION

PATENT NO. : 7,174,536 B2
APPLICATION NO. : 09/781638
DATED : February 6, 2007
INVENTOR(S) : Kothari et al.

It is certified that error appears in the above-identified patent and that said Letters Patent is hereby corrected as shown below:

On Title Page 2, item (56), under "Other Publications", in column 1, line 2, delete "Communcations" and insert -- Communications --, therefor.

On Title page 2, item (56), under "Other Publications", in column 1, line 17, delete "55-57" and insert -- 55-77 --, therefor.

On Title page 2, item (56), under "Other Publications", in column 1, line 26, delete "Deptartment" and insert -- Department --, therefor.

On Title page 2, item (56), under "Other Publications", in column 1, line 52, delete "Hiranadani" and insert -- Hiranandani --, therefor.

In column 5, line 40, delete "$\gamma$" and insert -- $\epsilon$ --, therefor.

In column 14, line 17, delete "electromechanical" and insert -- electro-mechanical --, therefor.

In column 15, lines 12-15, delete "(3) information conveyed ................................wireless communications." and insert the same on line 13 below "or".

In column 18, lines 4-12, delete "Control then continues..................................described above." and insert the same on line 3 after "window.".

In column 19, line 61, in Claim 1, after "code" delete ";" and insert -- , --, therefor.

In column 20, line 48, in Claim 10, after "code" delete ";" and insert -- , --, therefor.

Signed and Sealed this

Twenty-fourth Day of April, 2007

JON W. DUDAS
*Director of the United States Patent and Trademark Office*